US007049798B2

(12) United States Patent
Chapuis et al.

(10) Patent No.: US 7,049,798 B2
(45) Date of Patent: May 23, 2006

(54) SYSTEM AND METHOD FOR COMMUNICATING WITH A VOLTAGE REGULATOR

(75) Inventors: Alain Chapuis, Morgan Hill, CA (US); Mahesh N. Thaker, Moorpark, CA (US)

(73) Assignee: Power-One, Inc., Camarillo, CA (US)

( * ) Notice: Subject to any disclaimer, the term of this patent is extended or adjusted under 35 U.S.C. 154(b) by 726 days.

(21) Appl. No.: 10/293,001

(22) Filed: Nov. 13, 2002

(65) Prior Publication Data

US 2004/0093533 A1 May 13, 2004

(51) Int. Cl.
G05F 1/40 (2006.01)
(52) U.S. Cl. ...................................... 323/282
(58) Field of Classification Search ................ 323/282, 323/318, 351; 714/22; 713/300, 310, 330, 713/340
See application file for complete search history.

(56) References Cited

U.S. PATENT DOCUMENTS

| | | |
|---|---|---|
| 3,660,672 A | 5/1972 | Berger et al. |
| 4,194,147 A | 3/1980 | Payne et al. |
| 4,538,073 A | 8/1985 | Freige et al. |
| 4,538,101 A | 8/1985 | Shimpo et al. |
| 4,616,142 A | 10/1986 | Upadhyay et al. |
| 4,622,627 A | 11/1986 | Rodriguez et al. |
| 4,654,769 A | 3/1987 | Middlebrook |
| 5,053,920 A | 10/1991 | Staffiere et al. |
| 5,073,848 A | 12/1991 | Steigerwald et al. |
| 5,079,498 A | 1/1992 | Cleasby et al. |
| 5,229,699 A | 7/1993 | Chu et al. |
| 5,349,523 A | 9/1994 | Inou et al. |
| 5,377,090 A | 12/1994 | Steigerwald |
| 5,481,140 A | 1/1996 | Maruyama et al. |

(Continued)

FOREIGN PATENT DOCUMENTS

EP 0660487 6/1995

(Continued)

OTHER PUBLICATIONS

33702 Microproccessor Power Supply (3.0A) Analog Products MC33702 Fact Sheet; Motorola/Digital dna/Power Management Switching; pp. 1-4.

(Continued)

*Primary Examiner*—Adolf Berhane
(74) *Attorney, Agent, or Firm*—O'Melveny & Myers LLP

(57) ABSTRACT

A system and method is provided for using a point-on-load ("POL") control unit to program and/or monitor a POL regulator. Specifically, in one embodiment of the present invention, a power supply controller is adapted to provide initial-configuration data to at least one POL regulator. A POL control unit (located within the POL regulator) then stores at least a portion of the initial-configuration data in a storage device and uses at least a portion of the initial-configuration data to produce an output. The POL control unit is further adapted to store fault-monitoring data in the storage device and provide at least a portion of the fault-monitoring data to the controller. If the provided portion violates a known parameter, the controller (or POL control unit) may respond by perform a particular action (e.g., disable the POL regulator, etc.). In another embodiment of the present invention, the POL regulator further includes at least one sensor circuit adapted to produce fault monitoring data, or data that can be used to determine the fault-monitoring data. In another embodiment of the invention, the initial-configuration data and the fault-monitoring data are transmitted over a serial data bus.

50 Claims, 5 Drawing Sheets

U.S. PATENT DOCUMENTS

| | | |
|---|---|---|
| 5,532,577 A | 7/1996 | Doluca |
| 5,627,460 A | 5/1997 | Bazinet et al. |
| 5,815,018 A | 9/1998 | Soborski |
| 5,883,797 A | 3/1999 | Amaro et al. |
| 5,892,933 A | 4/1999 | Voltz |
| 5,905,370 A | 5/1999 | Bryson |
| 5,917,719 A | 6/1999 | Hoffman et al. |
| 5,929,618 A | 7/1999 | Boylan et al. |
| 5,943,227 A | 8/1999 | Bryson et al. |
| 5,946,495 A | 8/1999 | Scholhamer et al. |
| 5,990,669 A | 11/1999 | Brown |
| 6,057,607 A | 5/2000 | Rader, III et al. |
| 6,115,441 A * | 9/2000 | Douglass et al. ............. 377/25 |
| 6,157,182 A | 12/2000 | Tanaka et al. |
| 6,163,143 A | 12/2000 | Shimamori |
| 6,163,178 A * | 12/2000 | Stark et al. ................. 327/108 |
| 6,191,566 B1 | 2/2001 | Petricek et al. |
| 6,194,883 B1 | 2/2001 | Shimamori |
| 6,208,127 B1 | 3/2001 | Doluca |
| 6,211,579 B1 | 4/2001 | Blair |
| 6,262,900 B1 | 7/2001 | Suntio |
| 6,385,024 B1 | 5/2002 | Olson |
| 6,392,577 B1 | 5/2002 | Swanson et al. |
| 6,396,250 B1 | 5/2002 | Bridge |
| 6,421,259 B1 | 7/2002 | Brooks et al. |
| 6,429,630 B1 | 8/2002 | Pohlman et al. |
| 6,829,547 B1 | 12/2004 | Law et al. |
| 6,936,999 B1 * | 8/2005 | Chapuis ...................... 323/282 |
| 2001/0033152 A1 | 10/2001 | Pohlman et al. |
| 2002/0073347 A1 | 6/2002 | Zafarana et al. |
| 2002/0105227 A1 | 8/2002 | Nerone et al. |
| 2003/0122429 A1 | 7/2003 | Zhang et al. |
| 2003/0142513 A1 | 7/2003 | Vinciarelli |
| 2003/0201761 A1 | 10/2003 | Harris |
| 2004/0027101 A1 | 2/2004 | Vinciarelli |
| 2004/0090219 A1 * | 5/2004 | Chapuis ...................... 323/318 |
| 2004/0093533 A1 | 5/2004 | Chapuis et al. |
| 2004/0123164 A1 * | 6/2004 | Chapuis ...................... 713/300 |
| 2004/0123167 A1 * | 6/2004 | Chapuis ...................... 713/300 |
| 2004/0135560 A1 | 7/2004 | Kernahan et al. |
| 2004/0155640 A1 | 8/2004 | Sutardja et al. |
| 2004/0178780 A1 | 9/2004 | Chapuis |
| 2004/0246754 A1 | 12/2004 | Chapuis |
| 2005/0093594 A1 | 5/2005 | Kim et al. |
| 2005/0200344 A1 * | 9/2005 | Chapuis ...................... 323/282 |
| 2005/0223252 A1 * | 10/2005 | Chapuis ...................... 713/322 |

FOREIGN PATENT DOCUMENTS

| | | |
|---|---|---|
| EP | 0875994 | 11/1998 |
| RU | SU1814177 A1 | 5/1993 |
| WO | WO02/31951 | 4/2002 |
| WO | WO02/50690 | 6/2002 |

OTHER PUBLICATIONS

"Motorola Switch Mode Power Supply With Multiple Linear Regulators And Hign Speed CAN Transceiver" Motorola, Inc. 2002; digital dna; Analog Marketing; Rev. 2.5, Nov. 2002; 33394 Multi-Output Power Supply Semiconductor Technical Data.

"Power Management Solutions For Networking Applications"; Presented by Luc Darmon Smart Networks Developer Forum Jun. 4-6, 2003 Euro-Disney Paris, France; Motorola digital dna; www.motorola.com/sndf; pp. 1-26.

Preliminary Information 1.5 A Switch-Mode Power Supply With Linear Regulator 33701; Power Supply Integrated Circuit; Motorola Semiconductor Technical Data; Analog Marketing MC33701/D Rev. 1.0, May 2003; Motorola digital dna; pp. 1-24.

"The 12-C Bus Specification" Version 2.1; Jan. 2000; document order number: 9398 393 40011; Phillips Semiconductor; pp. 1-46.

"KEKB Power Supply Interface Controller Module" by A. Akiyama, T. Nakamura, M. Yoshida, T. Kubo, N. Yamamoto and T. Katoh KEK, High Energy Accelerator Research Organization, 1-1 Ohio, Tsukuba 305, Japan.

"Magnet Power Supply Control System KEKB Accelerators" by T.T. Nakamura, A. Akiyama, T. Katoh, Ta. Kubo, N. Yamamoto, M. Yoshida, KEK, Tsukuba, Japan International Conference On Accelerator And Large Experimental Physics Control Systems, 1999, Trieste, Italy, pp. 406-408.

"Electronics Products" by Paul Birman and Sarkis Nercessian, Kepco, Inc. Fluching NY vol. 37, No. 10, Electronic Products, Mar. 1995; The Engineer's Magazine of Product Technology; Power Supply Special; DSO Samples Single Shots at 10 Gsamples/s Speech Recognition On A Single Chip LCD Has Flat-Panel Bendfits At CRT Cost Product Update: High-Performance OP AMPS; A Hearst Business Publication; pp. 1, 5, 33-34.

"Quantization Resolution and Limit Cycling in Digitally Controlled PWM Converters" by Angel V. Peterchev and A.V. Sanders Electrical Engineering and Computer Science; UC Berkley; Power Electronics Specialists Conference, 2001.PESC, vol. 2, Jun. 17-21, 2001, pp. 465-471; XP002274573.

"System Management Bus Specification", Smart Battery System Specifications Copyright 1996, 1997, 1998, Benchmarq Microelectronics Inc., Duracell Inc., Energizer Power Systems, Intel Corporation, Linear Technology Corporation, Maxim Integrated Products, Mitsubishi Electric Corporation, National Semiconductor Corporation, Toshiba Battery Co., Varta Batterie AG; Revision 1.1, Dec. 11, 1998; pp. 1-39.

* cited by examiner

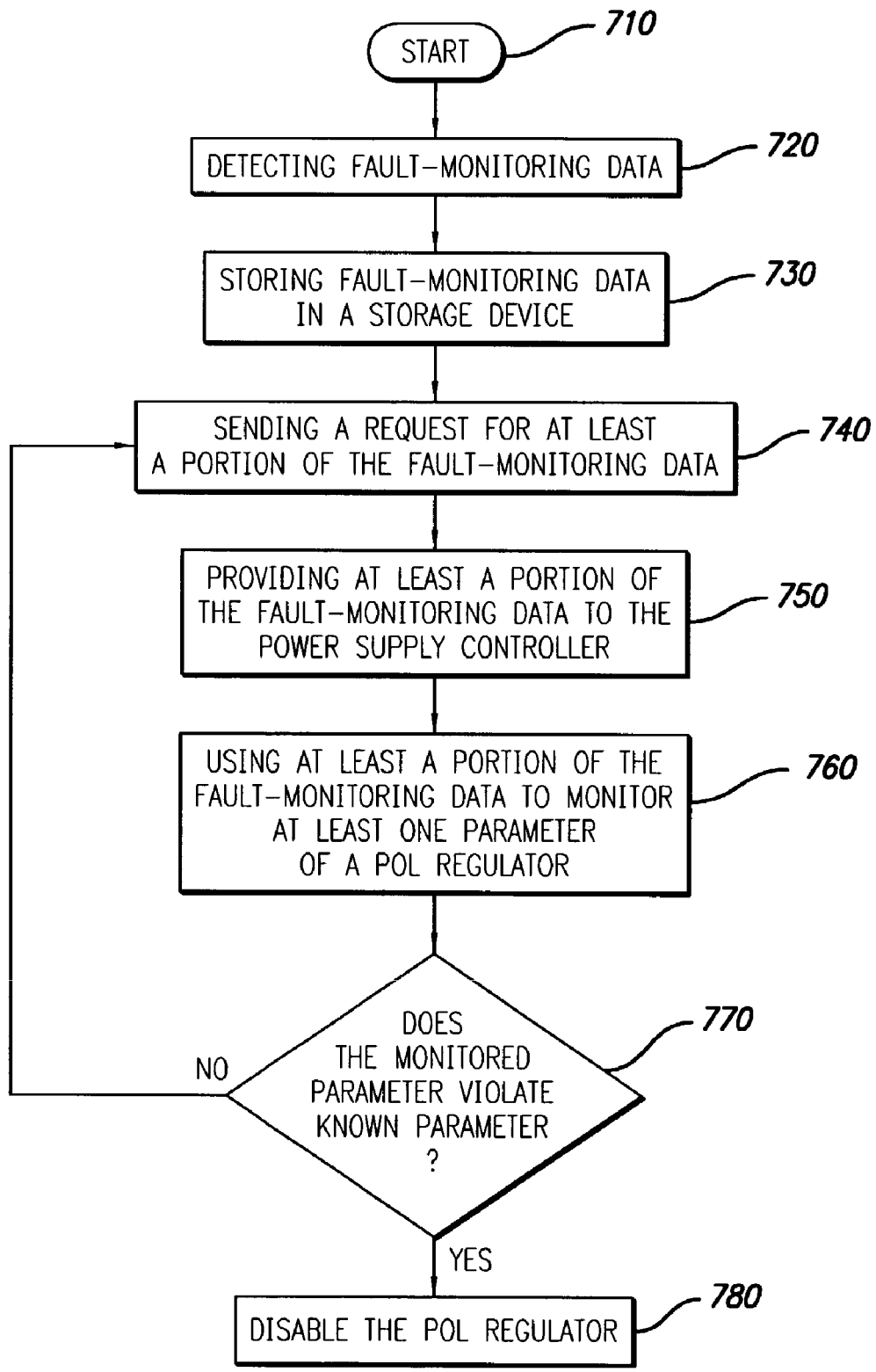

SYSTEM AND METHOD FOR COMMUNICATING WITH A VOLTAGE REGULATOR

BACKGROUND OF THE INVENTION

1. Field of the Invention

The present invention relates to controlling a point-of-load ("POL") regulator, or more particularly, to a system and method of utilizing a POL control unit to program and/or monitor a POL regulator.

2. Description of Related Art

Point-of-load ("POL") regulators, which are also referred to as voltage regulators or DC/DC converters, are commonly used in conjunction with electronic circuits. This is because the voltage/current requirements of electronic circuits typically differ from the voltage that is readily available or the current that can practically be delivered. For example, some electronic devices only include a single voltage input (e.g., 12 v), but require different voltages for circuits contained within (e.g., 3 v, 5 v, 9 v, etc.). A common solution is to design multiple POL regulators within the device for converting the single input voltage into multiple voltage levels.

Similarly, some electronic devices include circuits that require low voltage (e.g., 1 v), high current (e.g., 100 A) power supplies. This is problematic in that it is impractical to deliver high current at low voltage levels over a relatively long distance and still meet desired regulation performances. A common solution is to use a high voltage, low current power supply and design a POL regulator near the internal circuit. This allows low current to travel throughout the device, and provides a low voltage, high current power supply (i.e., using the POL regulator) near the internal circuit.

Traditionally, POL regulators operate in conjunction with at least one power supply controller. The controller activates and partially programs the POL regulator by providing data directly to the POL regulator, and monitors the POL regulator by measuring data external to the POL regulator. Specifically, the controller provides the POL regulator with output-voltage-set-point data and enable data. The POL regulator, which has been manually pre-programmed (e.g., hard wired, etc.) to produce a particular current level, produces an output having a voltage level in accordance with the output-voltage-set-point data. The output of the POL regulator passes through a current sense resistor and a transistor switch connected in series with a load circuit. The controller, through its connections to the current sense resistor and the output terminal of the POL regulator, is then able to measure the output voltage/current that is being delivered by the POL regulator. If the output voltage or current exceeds a known value, the controller can disable the POL regulator by communicating directly with the POL regulator or disconnecting the load by opening the transistor switch.

The drawback with such a control system is that it adds complexity, expense and size to the control system by requiring the controller to communicate with multiple devices (e.g., a POL regulator and an external circuit) to program and monitor the POL regulator. Such a system also limits the type of programming and monitoring that can be performed. Thus, it would be advantageous to have a system and method of programming and/or monitoring a POL regulator that overcomes these drawbacks.

SUMMARY OF THE INVENTION

The present invention provides a system and method of utilizing a point-on-load ("POL") control unit for programming and/or monitoring a POL regulator. Embodiments of the present invention operate in accordance with a power supply controller ("controller") and at least one POL regulator, each POL regulator including a control unit and a storage device. Specifically, the controller is adapted to provide initial-configuration data to each POL regulator. The initial-configuration data, which may include output-voltage-set-point-data (i.e., a desired output voltage), output-current-set-point data (i.e., the highest desired output current), low-voltage-limit data (i.e., the lowest desired output voltage), high-voltage-limit data (i.e., the highest desired output voltage), output-voltage-slew-rate data (i.e., the desired output slew rate), enable/disable data (i.e., turning on/off the POL regulator output), and/or other POL programming data (e.g., voltage, current, temperature, timing data), is then received by the POL control unit and stored in the storage device. At least a portion of the initial-configuration data is then used to produce a desired output of the POL regulator.

The POL control unit is also adapted to store fault-monitoring data in the storage device and provide at least a portion of the fault-monitoring data to the controller. If the provided portion of the fault-monitoring data, which may include output-voltage data (e.g., actual-output-voltage data, voltage-comparison data, etc.), output-current data (e.g., actual-output-current data, current-comparison data, etc.), temperature-status data (e.g., actual-temperature data, temperature-comparison data, etc.), and/or other POL fault monitoring data, violates a known parameter, the controller may respond by performing a particular action (e.g., disable the POL regulator, closely monitor a particular parameter, store the provided portion of fault-monitoring data, notify an administrator, etc.). In another embodiment of the present invention, the POL control unit is also adapted to respond to a violation by performing a particular action (e.g., disabling the POL regulator, notifying the controller, etc.).

In another embodiment of the present invention, the POL regulator further includes at least one sensor circuit. The sensor circuit, which may be adapted to detect voltage levels, current levels, temperature levels, etc., is used to produce the fault-monitoring data (either alone or in conjunction with information stored in the storage device).

In another embodiment of the invention, the initial-configuration data and the fault-monitoring data are transmitted over a bi-directional serial data bus (either synchronously or asynchronous). In other words, the bi-directional serial data bus is either a two-wire serial bus (e.g., I$^2$C) that allows data to be transmitted asynchronously or a single-wire serial data bus that allows data to be transmitted synchronously (i.e., synchronized to a clock signal). In another embodiment of the present invention, the serial data bus (or a portion thereof is superimposed over (or coexistent with) a power bus used to deliver power from a front-end converter to the POL regulator.

A more complete understanding of the system and method of utilizing a POL control unit to program and/or monitor a POL regulator will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 3-1 depicts a POL regulator operating in accordance with one embodiment of the present invention.

FIG. 3-2 depicts a POL regulator operating in accordance with another embodiment of the present invention.

FIG. 7 is a flow chart depicting one method of providing/utilizing fault-monitoring data in accordance with the present invention.

DETAILED DESCRIPTION OF THE PREFERRED EMBODIMENT

The present invention provides a system and method of utilizing a point-on-load ("POL") control unit to program and/or monitor a POL regulator. In the detailed description that follows, like element numerals are used to describe like elements illustrated in one or more figures.

Figure 1:
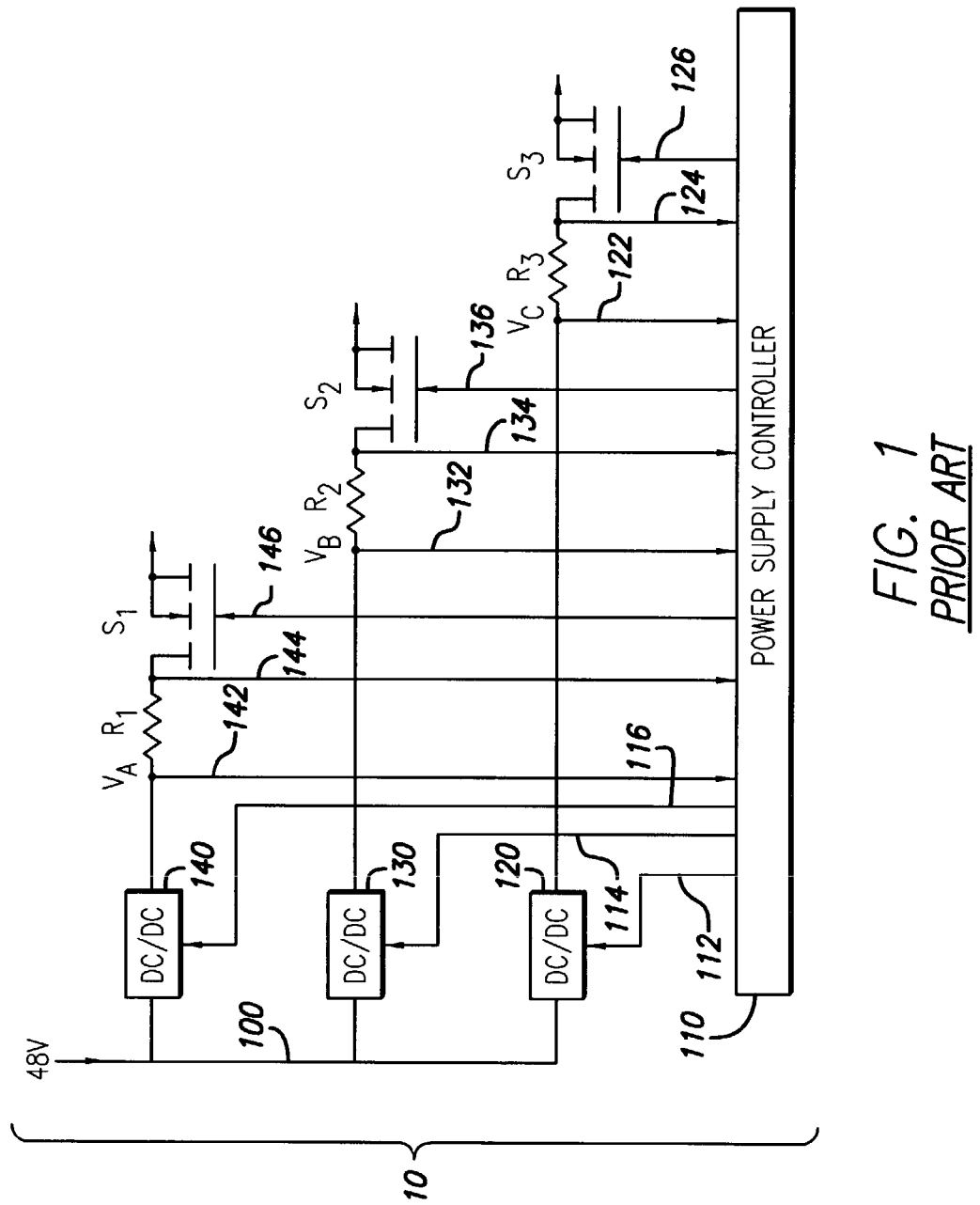
FIG. 1 depicts a prior art POL or DC/DC control system.

FIG. 1 illustrates a prior art DC/DC control system 10 where the power supply controller ("controller") 110 communicates with a plurality of DC/DC converters (i.e., 120, 130 and 140), also referred to as voltage regulators or POL regulators, via a plurality of six bit parallel buses (i.e., 112, 114 and 116), and a plurality of external circuits (e.g., R1/S1, R2/S2, R3/S3) via a plurality of three-wire output connections (i.e., 122–126, 132–136, and 142–146). More particularly, each six bit parallel bus includes an enable/disable bit and five VID code bits, and each three-wire output connection includes a voltage monitoring line (i.e., 122, 132 and 142), a current monitoring line (i.e., 124, 134 and 144), and a switch enable line (i.e., 126, 136, 146).

As shown in FIG. 1, the controller 110 controls the output voltage of each DC/DC converter by activating and partially programming the converter via the six bit parallel bus, and monitoring the converter via the three-wire output connection. For example, the controller 110 provides output-voltage-set-point data to the DC/DC converter 140 via the VID code portion of the six bit parallel bus 116. The controller 110 then activates the DC/DC converter 140 via the enable/disable portion of the six bit parallel bus 116. Once activated, and in accordance with the output-voltage-set-point data, the DC/DC converter 140 converts the voltage provided via the power supply 100 (e.g., 48 v) into an output voltage $V_A$. The controller 110 then verifies that the output voltage $V_A$ is the desired voltage by measuring the voltage via the voltage monitoring line 142. If the output voltage $V_A$ is acceptable, it is provided to the load (not shown) by activating the transistor switch $S_1$ via the switch enable line 146. The controller 110 can then continuously monitor the output voltage and the output current by measuring the voltage via the voltage monitoring line 142 and measuring the voltage drop across the sense resistor $R_1$ (i.e., the voltage differential between the current monitoring line 144 and the voltage monitoring line 142), respectively. The controller 110 communicates (i.e., partially programs, activates, and monitors) with the remaining DC/DC converters 120, 130 in the same manner.

The problem with such a control system 10 is that it adds complexity, expense and size to the overall electronic device (not shown) by requiring the controller 110 to communicate with multiple devices (e.g., converter 140 and external circuit R1, S1) in order to program and monitor a particular DC/DC converter (e.g., 140). Such a control system 10 also limits the type of programming and monitoring that can be performed. For example, while the output voltage level of the DC/DC converter can be programmed via the six bit parallel bus, other parameters (e.g., maximum output current, slew rate, etc.) need to be manually selected (e.g., hard wired, etc.). Furthermore, while the output voltage/current level of the DC/DC converter can be monitored via the three-wire output connection, additional parameters (e.g., temperature status, etc.) cannot be monitored without additional circuitry and/or connections.

Figure 2:
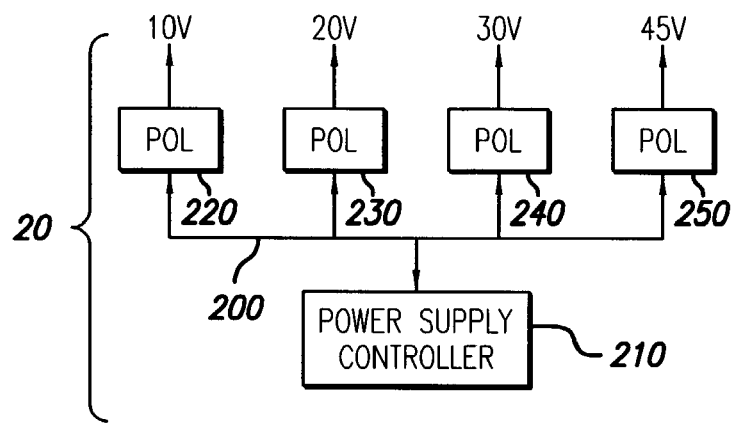
FIG. 2 depicts a POL control system operating in accordance with one embodiment of the present invention.

FIG. 2 illustrates a POL control system 20 operating in accordance with one embodiment of the present invention. Specifically, a controller 210 communicates with a plurality of POL regulators (i.e., 220, 230, 240 and 250) via a bus 200. It should be appreciated that the POL regulators depicted herein (e.g., 220, etc) include, but are not limited to, point-of-load regulators, power-on-load regulators, DC/DC converters, voltage regulators, and all other programmable voltage or current regulating devices (including all single and multiple output devices) generally known to those skilled in the art. It should further be appreciated that the controller (e.g., 210) may exist as a stand-alone device (as depicted in FIG. 2) or integrated into another device, such as a front-end converter (not shown) or another POL regulator.

Figures 1, 3:
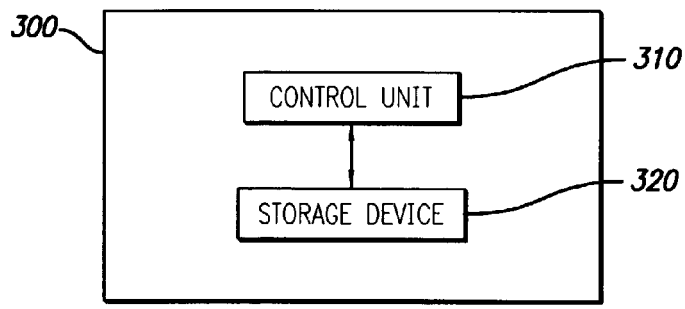
Figures 2, 3:
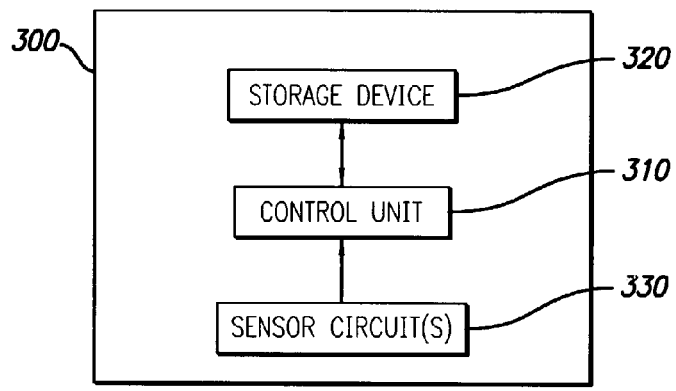

In one embodiment of the present invention, as shown in FIG. 3-1, each POL regulator 300 includes a power-on-load control unit 310 ("POL control unit") and a storage device 320. It should be appreciated that the POL control unit 310 includes, but is not limited to, application specific integrated circuits (ASICs), processors, microprocessors, and all other computing devices generally known to those skilled in the art. It should also be appreciated that the storage device 320 can be a long term or short term storage device, including, but not limited to, registers, RAM, ROM, EPROM, EEPROM, flash memory, and all other digital data storage devices generally known to those skilled in the art. It should further be appreciated that the location of the storage device 320 depicted in FIGS. 3-1 and 3-2 is merely to illustrate the environment in which the present invention operates, and should not be considered a limitation on the present invention. Thus, for example, a storage device that is located within the POL control unit 310 or outside of the POL regulator 300 is within the spirit and scope of the present invention.

Referring to FIGS. 2 and 3-1, the controller 210 is adapted to provide initial-configuration data to each POL regulator (i.e., 220, 230, 240, 250). It should be appreciated that the initial-configuration data may include, but is not limited to, one or more of the following: output-voltage-set-point-data (i.e., a desired output voltage); output-current-set-point data (i.e., the highest desired output current); low-voltage-limit data (i.e., the lowest desired output voltage); high-voltage-limit data (i.e., the highest desired output voltage); output-voltage-slew-rate data (i.e., the desired output slew rate); enable/disable data (i.e., turning on/off the POL regulator output); timing data (e.g., turn-on delay, turn-off delay, fault recovery time, etc.) and/or all other types of POL programming data generally known to those skilled in the art. Once the initial-configuration data is received, the POL control unit 310 is adapted to store at least a portion of the initial-configuration data in the storage device 320. For example, if the storage device 320 is a plurality of registers, the output-voltage-set-point data may be stored in an output-voltage-set-point register, the output-current-set-point data may be stored in an output-current-set-point register, the low-voltage-limit data and the high-voltage data may be stored in a protection configuration register, and the enable/disable data may be stored in a status register. At least a portion of the stored initial-configuration data is then used to produce a desired output. For example, an output may be produced to include a particular voltage level, a particular slew rate, etc.—depending on the type of initial-configuration data received/stored.

After the output has been produced, the POL control unit 310 is adapted to receive fault-monitoring data (e.g., from an external device, a sense circuit, etc.). The fault-monitoring data, which contains information on the POL regulator or its output, is then stored in the storage device 320. The POL control unit 310, in response to a condition (e.g., receiving a request, exceeding a known parameter, having a register's contents change, etc.), is then adapted to provide at least a portion of the fault-monitoring data to the controller 210. It should be appreciated that the fault-monitoring data may include, but is not limited to, one or more of the following: output-voltage data, which may include actual-output-voltage data (i.e., the measured output voltage) or voltage-comparison data (e.g., whether the measured output voltage is above or below the highest desired output voltage, whether the measured output voltage is above or below the lowest desired output voltage, etc.); output-current data, which may include actual-output-current data (i.e., the measured output current) or current-comparison data (e.g., whether the measured output current is above or below the highest desired output current); temperature-status data, which may include actual-temperature data (i.e., the measured temperature of a POL regulator, or more particularly its heat generating components) or temperature-comparison data (e.g., whether the temperature of the POL regulator (or its components) is above or below a known value, etc.), and/or all other types of POL fault monitoring data generally known to those skilled in the art. It should also be appreciated that fault-monitoring data is not limited to data representing the existence of a faulty condition. For example, fault-monitoring data that indicates that the POL regulator is operating within acceptable parameters (e.g., within an acceptable temperature range) is within the spirit and scope of the present invention.

The fault-monitoring data can be used by either the controller 210 or the control unit 310 to monitor and/or control the POL regulator. In other words, the control unit 310 can use the fault-monitoring data to either provide POL status information (i.e., data corresponding to a particular POL regulator or its output) to the controller 210 or disable the POL regulator if a particular condition is met (e.g., the status register changes; the temperature limit has been exceeded, etc.). Alternatively, the controller 210 can use the fault-monitoring data to either provide POL status information to an administrator, disable a particular POL regulator, or store the fault-monitoring data for future use. For example, in one embodiment of the present invention, each POL regulator includes unique ID data (e.g., serial number, date of manufacture, etc.) stored in an ID register. This enables the controller 210 to provide POL status information and unique ID data to an administrator.

In another embodiment of the present invention, as shown in FIG. 3-2, each POL regulator 300 further includes at least one sensor circuit 330. The sensor circuit 330 is used to produce either the fault-monitoring data, or data that can be used (e.g., together with information stored in the storage device 320) to produce the fault-monitoring data. It should be appreciated that the sensor circuit 330, as described herein, will vary (e.g., as to circuitry, location, inputs, etc.) depending upon the type of information that is being detected. For example, a sensor circuit that detects current may include different circuitry, have different inputs, and be placed in a different location than a sensor circuit that detects temperature. It should also be appreciated that the location, type, and/or number of components illustrated in FIGS. 3-1 and 3-2 are merely to exemplify the environment in which the present invention operates, and should not be considered limitations of the present invention. For example, a POL regulator including more than one sensor circuit, having components in different locations (e.g., a sensor circuit within the POL control unit, a sensor circuit external to the POL regulator, etc.), or having additional (or fewer) components is within the spirit and scope of the present invention.

While the initial-configuration data and the fault-monitoring data can be transmitted via a parallel bus, one embodiment of the present invention involves transmitting the initial-configuration data and the fault-monitoring data over a bi-directional serial data bus (either synchronously or asynchronous). In other words, the bi-directional serial bus is either a two-wire serial data bus (e.g., $I^2C$) that allows data to be transmitted asynchronously or a single-wire serial data bus that allows data to be transmitted synchronously (i.e., synchronized to a clock signal). In another embodiment of the present invention the serial data bus (or a portion thereof) is superimposed over (or coexistent with) a power bus used to deliver power from the front-end converter to the POL regulators.

Figure 4:
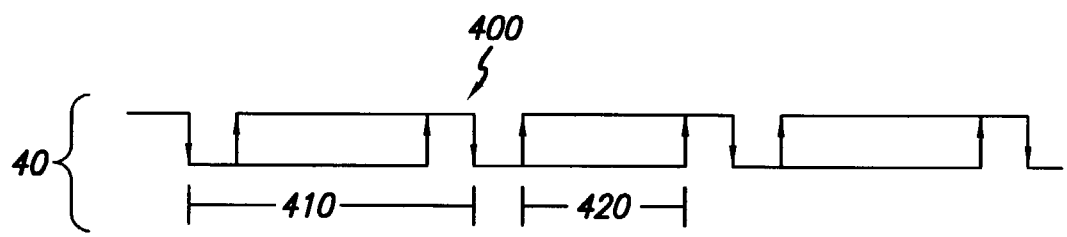
FIG. 4 illustrates one method of communicating with a POL regulator over a serial bus.

FIG. 4 illustrates one method of communicating over a single-wire serial bus. Specifically, a transmission line 40 is created by propagating a clock signal 400 over the serial bus. The clock signal 400 can be generated by the controller, a particular POL regulator (e.g., the POL regulator with the least significant address), or an external device. The clock signal 400 synchronizes the various communicating devices (i.e., the POL regulators and the controller) and creates a series of clock cycles 410, each one including a data bit 420. This allows the various communicating devices to transmit a single bit of data for every clock cycle 410. In other words, each communicating device transmits data by leaving/pulling the data bit 420 high or low (i.e., binary one or zero). It should be appreciated that FIG. 4, as discussed herein, is not intended to limit the present invention, but to provide an example as to how communication can occur over a single-wire serial bus.

Figure 5:
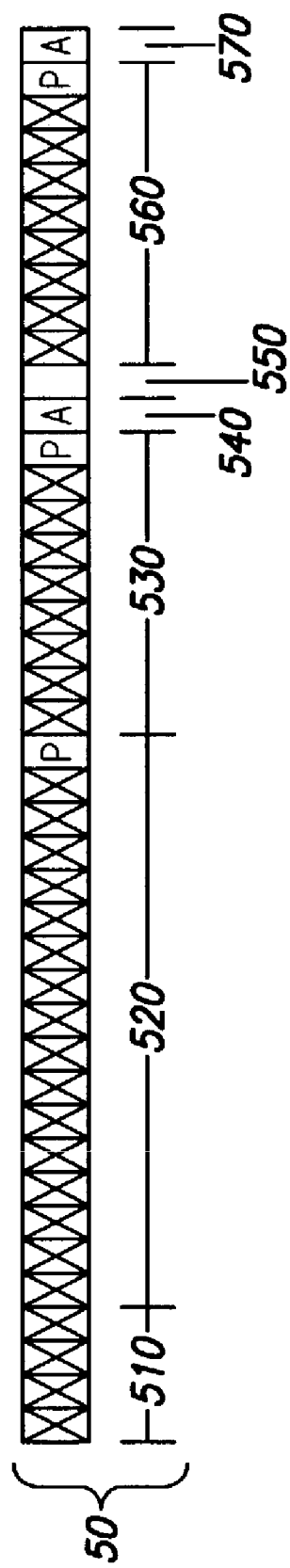
FIG. 5 illustrates one communication cycle that may be transmitted to/from a POL regulator.

FIG. 5 illustrates one method of transmitting information between the controller and at least one POL regulator. Specifically, a forty-two bit communication cycle 50 can be used to transmit initial-configuration data, fault-monitoring data, and/or unique ID data. As shown in FIG. 5, the forty-two bit transmission cycle 50 includes a four bit start sequence 510, a sixteen bit (with parity) address set 520, an eight bit (with parity) command set 530, a first acknowledgement bit 540, an eight bit (with parity) data set 560, and a second acknowledge bit 570. An additional bit 550 has been added to ensure that the command set 540 is executed before the data set 560 is provided. It should be appreciated that the communication cycle 50 depicted in FIG. 5 is not intended to limit the present invention, but to illustrate how information can be transmitted over a serial bus. Therefore, communication cycles containing more or less information and/or bits is within the spirit and scope of the present invention.

The first and second acknowledgement bits 540, 570 are used to acknowledge the reception of the command set 530 and the data set 560, respectively. It should be appreciated that the device responsible for the providing the first and second acknowledgement bits 540, 570 varies depending upon whether the information is being sent to or from the POL regulator (i.e., whether the information is being written, read, or provided).

The command set 530, data set 560, and address set 520 enable the controller and the POL regulators to write, read and provide data. Specifically, (i) the command set 530 is used to identify whether and what the controller is writing (e.g., writing to the status register), the controller is reading (e.g., reading the status register), or the POL regulator is providing (e.g., providing status register information), (ii) the address set 520 is used to identify the POL regulator(s) that is being written to or read, or the POL regulator that is providing information, and (iii) the data set 560 is used to identify the actual data that is being written, read, or provided.

The start sequence 510 and address set 520 are used, in part, to identify the sender of the information. For example, the controller uses a different start sequence 510 than the POL regulators. Thus, the controller can determine, by reading the start sequence 510 of the communication cycle 50 being transmitted, whether a POL regulator is also attempting to send a communication cycle 50 at the same time. Similarly, each POL regulator has a different address set 520. Thus, a POL regulator can determine, by reading the start sequence 510 and address set 520 of the communication cycle 50 being transmitted, whether another POL regulator or the controller is also attempting to send a communication cycle 50 at the same time. If multiple devices are attempting to send a communication cycle 50, sequencing data is used to allocate or arbitrate bus use. It should be appreciated that the sequence data can either be stored (or hard wired) as a default value or provided as initial-configuration data and stored in the storage device (e.g., a sequencing configuration register).

Figure 6:
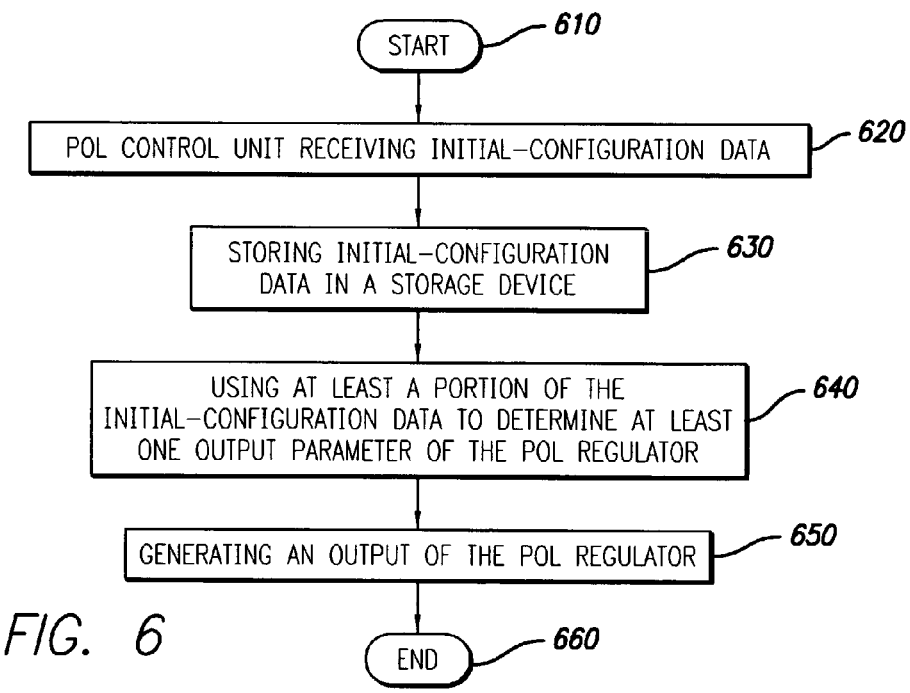
FIG. 6 is a flow chart depicting one method of providing/utilizing initial-communication data in accordance with the present invention.

One method of providing/utilizing initial-communication data is illustrated in FIG. 6, starting at step 610. Specifically, at step 620, the POL control unit begins by receiving initial-configuration data (e.g., output-voltage-set-point, output-current-set-point, etc.). The initial-configuration data is then stored in the storage device at step 630. At step 640, the POL control unit uses at least a portion of the initial-configuration data to determine at least one output parameter (e.g., voltage level, slew rate, etc.) of the POL regulator. The POL control unit then generates an output including said output parameter(s) at step 650, ending the process at step 660.

One method of providing/utilizing fault-monitoring data is illustrated in FIG. 7, starting at step 710. Specifically, at step 720, the POL regulator, or more particularly the sensor circuit (either alone or together with information stored in the storage device) detects fault-monitoring data (e.g., output-voltage data, output-current data, etc.). The fault-monitoring data is then stored in the storage device at step 730. At step 740, the controller sends (and the POL control unit receives) a request for at least a portion of the fault-monitoring data. At step 750, the POL control unit provides the requested portion of the fault-monitoring data to the controller. The controller, at step 760, uses the requested portion of the fault-monitoring data to monitor at least one parameter of the POL regulator. At step 770, the controller determines whether the monitored parameter violates a known parameter. For example, if the monitored parameter is output voltage, the output voltage could be compared to a maximum output voltage value. If a violation occurs (e.g., the output voltage exceeds a maximum output voltage value), then the POL regulator would be disabled at step 780. Alternatively, if a violation does not occur, the controller continues monitoring the POL regulator by again requesting at least a portion of fault-monitoring data at step 740. It should be appreciated that while it may be advantageous to disable a POL regulator in light of a violation, the present invention is not limited to such a result. For example, a controller or a POL regulator may be programmed to perform a different action (e.g., closely monitor the faulty POL regulator, notify the administrator, store fault-monitoring data, etc.) if a particular parameter violation occurs.

In another embodiment of the invention, the fault-monitoring data itself indicates whether a monitored parameter violates a known parameter. For example, if output-current-set-point data (i.e., the highest desired output current) is received as initial-configuration data and stored in the storage device, the POL regulator (or more particular the POL control unit) can provide the controller with fault-monitoring data that indicates whether the measured output current is over or under the stored maximum current value. In this instance, if the received fault-monitoring data indicates that the output current is below the maximum value, the controller can continue to monitor the POL regulator as previously described. Alternatively, if the received fault-monitoring data indicates that the output current is above the maximum value, the controller (without making any additional calculations) can disable the POL regulator.

Having thus described a preferred embodiment of a system and method of controlling a point-of-load regulator, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

What is claimed is:

1. A power control system comprising:
    a power supply controller adapted to provide initial-configuration data and receive fault-monitoring data;
    a serial data bus connected to said power supply controller to communicate said initial configuration data and fault-monitoring data; and
    at least one point-of-load ("POL") regulator connected to said data bus, adapted to produce an output in accordance with at least a portion of said initial-configuration data, said at least one POL regulator comprising:
        a storage device adapted to store said initial-configuration data and said fault-monitoring data; and
        a control unit adapted to provide at least a portion of said fault-monitoring data to said power supply controller.

2. The power control system of claim 1, wherein said at least one POL regulator further comprises at least one sensor circuit for detecting information corresponding to said fault-monitoring data.

3. The power control system of claim 1, wherein said initial-configuration data includes at least output-voltage-set-point data corresponding to a desired voltage level of said output.

4. The power control system of claim 1, wherein said initial-configuration data includes at least output-current-set-point data corresponding to a desired maximum current level of said output.

5. The power control system of claim 1, wherein said initial-configuration data includes at least low-voltage-limit data corresponding to a lowest desired voltage level of said output.

6. The power control system of claim 1, wherein said initial-configuration data includes at least high-voltage-limit data corresponding to a highest desired voltage level of said output.

7. The power control system of claim 1, wherein said initial-configuration data includes at least output-voltage-slew-rate data corresponding to a desired slew rate of said output.

8. The power control system of claim 1, wherein said initial-configuration data includes at least enable/disable data.

9. The power control system of claim 1, wherein said initial-configuration data includes at least timing data.

10. The power control system of claim 1, wherein said fault-monitoring data includes at least output-voltage data that is based upon a measured voltage level of said output.

11. The power control system of claim 10, wherein said output-voltage data corresponds to said measured voltage level of said output.

12. The power control system of claim 10, wherein said output-voltage data corresponds to a comparison of said measured voltage level of said output and a known voltage value.

13. The power control system of claim 1, wherein said fault-monitoring data includes at least output-current data that is based upon a measured current level of said output.

14. The power control system of claim 13, wherein said output-current data corresponds to said measured current level of said output.

15. The power control system of claim 13, wherein said output-current data corresponds to a comparison of said measured current level of said output and a known current value.

16. The power control system of claim 1, wherein said fault-monitoring data includes at least temperature-status data that is based upon a measured temperature level of said at least one point-of-load regulator.

17. The power control system of claim 16, wherein said temperature-status data corresponds to said measured temperature level of said at least one point-of-load regulator.

18. The power control system of claim 16, wherein said temperature-status data corresponds to a comparison of said measured temperature level of said at least one point-of-load regulator and a known temperature value.

19. The power control system of claim 1, wherein said data bus further comprises a bi-directional, single-wire serial data bus adapted to transmit said initial-configuration data and said fault-monitoring data synchronously.

20. The power control system of claim 1, wherein said data bus further comprises a bi-directional, dual-wire serial data bus adapted to transmit said initial-configuration data and said fault-monitoring data asynchronously.

21. The power control system of claim 19, wherein said data bus further provides power to said at least one POL regulator.

22. The power control system of claim 20, wherein at least a portion of said data bus further provides power to said at least one POL regulator.

23. The power control system of claim 1, wherein said initial-configuration data includes at least sequencing data, said data bus being allocated to said at least one POL regulator in accordance with said sequencing data.

24. A method of controlling at least one point-of-load ("POL") regulator comprising:
 receiving initial-configuration data from a controller via a serial data bus;
 storing at least a portion of said initial-configuration data in a POL storage device;
 using at least a portion of said initial-configuration data to determine at least one output-parameter of an output of said at least one POL regulator;
 generating said output;
 storing fault-monitoring data in said POL storage device;
 providing at least a portion of said fault-monitoring data to said controller via said serial data bus; and
 using said at least a portion of said fault-monitoring data to monitor at least one POL-parameter of said at least one POL regulator.

25. The method of claim 24, further comprising detecting said fault-monitoring data before said fault-monitoring data is stored in said POL storage device.

26. The method of claim 24, wherein said initial-configuration data includes at least enable data, and said step of generating said output further comprises generating said output in response to receiving said enable data.

27. The method of claim 24, wherein said step of providing at least a portion of said fault-monitoring data to said controller is performed in response to receiving a request for said at least a portion of said fault-monitoring data.

28. The method of claim 24, wherein said step of providing at least a portion of said fault-monitoring data to said controller is performed independent of a request for said at least a portion of said fault-monitoring data.

29. The method of claim 28, wherein said step of providing at least a portion of said fault-monitoring data to said controller is performed if said at least a portion of said fault-monitoring data changes.

30. The method of claim 28, wherein said step of providing at least a portion of said fault-monitoring data to said controller is performed if said at least one POL-parameter violates a known parameter.

31. The method of claim 30, further comprising said at least one POL regulator disabling itself if said at least one POL parameter violates said known parameter, and said step of providing at least a portion of said fault-monitoring data to said controller further comprises providing data indicating that said at least one POL regulator has been disabled to said controller.

32. The method of claim 24, wherein said initial-configuration data includes output-voltage-set-point data, and said step of using said at least a portion of said initial-configuration data further includes using said output-voltage-set-point data to determine the voltage level of said output of said at least one POL regulator.

33. The method of claim 24, wherein said initial-configuration data includes output-voltage-slew-rate data, and said step of using said at least a portion of said initial-configuration data further includes using said output-voltage-slew-rate data to determine the slew rate of said output of said at least one POL regulator.

34. The method of claim 24, wherein said initial-configuration data includes timing data, and said step of using said at least a portion of said initial-configuration data further includes using said timing data to determine when said at least one POL regulator is to perform a particular action.

35. The method of claim 24, wherein said fault-monitoring data includes actual-output-voltage data, and said step of using said at least a portion of said fault-monitoring data further includes using said actual-output-voltage data to monitor the output voltage level of said at least one POL regulator.

36. The method of claim 24, wherein said fault-monitoring data includes voltage-comparison data, and said step of using said at least a portion of said fault-monitoring data further includes using said voltage-comparison data to monitor the output voltage level of said at least one POL regulator in relation to a known parameter.

37. The method of claim 24, wherein said fault-monitoring data includes actual-output-current data, and said step of using said at least a portion of said fault-monitoring data further includes using said actual-output-current data to monitor the output current level of said at least one POL regulator.

38. The method of claim 24, wherein said fault-monitoring data includes current-comparison data, and said step of using said at least a portion of said fault-monitoring data further includes using said current-comparison data to monitor the output current level of said at least one POL regulator in relation to a known parameter.

39. The method of claim 24, wherein said fault-monitoring data includes actual-temperature data, and said step of using said at least a portion of said fault-monitoring data further includes using said actual-temperature data to monitor the temperature of said at least one POL regulator.

40. The method of claim 24, wherein said fault-monitoring data includes temperature-comparison data, and said step of using said at least a portion of said fault-monitoring data further includes using said temperature-comparison data to monitor the temperature of said at least one POL regulator in relation to a known parameter.

41. The method of claim 24, further comprising providing unique ID data corresponding to said at least one POL regulator to said controller.

42. The method of claim 24, further comprising performing a particular action if said at least a portion of said fault-monitoring data violates a known parameter.

43. The method of claim 24, wherein said step of performing a particular action further comprises disabling said at least one POL regulator if said at least a portion of said fault-monitoring data violates a known parameter.

44. A method of controlling at least one point-of-load ("POL") regulator comprising:
    storing fault-monitoring data in a storage device;
    sending a request for at least a portion of said fault-monitoring data;
    providing said at least a portion of said fault-monitoring data in response to receiving said request;
    using said at least a portion of said fault-monitoring data to monitor at least one parameter of said at least one POL regulator; and
    disabling said at least one POL regulator if said at least one parameter violates a known parameter.

45. The method of claim 44, wherein said at least a portion of said fault-monitoring data includes actual-output-voltage data, and said step of using said at least a portion of said fault-monitoring data further includes using said actual-output-voltage data to monitor the output voltage level of said at least one POL regulator.

46. The method of claim 44, wherein said at least a portion of said fault-monitoring data includes voltage-comparison data, and said step of using said at least a portion of said fault-monitoring data further includes using said voltage-comparison data to monitor the output voltage level of said at least one POL regulator in relation to a known parameter.

47. The method of claim 45, wherein said at least a portion of said fault-monitoring data includes actual-output-current data, and said step of using said at least a portion of said fault-monitoring data further includes using said actual-output-current data to monitor the output current level of said at least one POL regulator.

48. The method of claim 44, wherein said at least a portion of said fault-monitoring data includes current-comparison data, and said step of using said at least a portion of said fault-monitoring data further includes using said current-comparison data to monitor the output current level of said at least one POL regulator in relation to a known parameter.

49. The method of claim 44, wherein said at least a portion of said fault-monitoring data includes actual-temperature data, and said step of using said at least a portion of said fault-monitoring data further includes using said actual-temperature data to monitor the temperature of said at least one POL regulator.

50. The method of claim 44, wherein said at least a portion of said fault-monitoring data includes temperature-comparison data, and said step of using said at least a portion of said fault-monitoring data further includes using said temperature-comparison data to monitor the temperature of said at least one POL regulator in relation to a known parameter.

* * * * *

UNITED STATES PATENT AND TRADEMARK OFFICE
Certificate

Patent No. 7,049,798 B2　　　　　　　　　　　　　　　　　　　　　　Patented: May 23, 2006

On petition requesting issuance of a certificate for correction of inventorship pursuant to 35 U.S.C. 256, it has been found that the above identified patent, through error and without any deceptive intent, improperly sets forth the inventorship.
Accordingly, it is hereby certified that the correct inventorship of this patent is: Alain Chapuis, Morgan Hill, CA (US); and Mikhail Guz, Daly City, CA (US).

Signed and Sealed this Fourth Day of September 2007.

KARL D. EASTHOM
*Supervisory Patent Examiner*
Art Unit 2838